Sept. 30, 1947.   E. WINER   2,428,323
WATERPROOF CAP PROTECTOR FOR CONNECTOR ENDS OF ELECTRIC CABLES
Filed Feb. 14, 1944   2 Sheets-Sheet 1

Inventor
Ephraim Winer,
By
KARL W. FLOCKS
Attorney

Patented Sept. 30, 1947

2,428,323

UNITED STATES PATENT OFFICE 2,428,323

WATERPROOF CAP PROTECTOR FOR CONNECTOR ENDS OF ELECTRIC CABLES

Ephraim Winer, Baltimore, Md., assignor to The National Plastic Products Company, Odenton, Md., a corporation of Maryland Application February 14, 1944, Serial No. 522,322

7 Claims. (Cl. 174—77)

This invention relates to temporarily water proofing the connector end of an electrical cable and more particularly to mechanisms which cooperate with fixtures on the connector ends of electrical cables to provide a water proof seal therefor.

Prior to the instant invention, protectors for the connector ends of cable have been of such design and construction that while they performed the function of making the end of the cable dust proof and dirt proof, the connector end of the cable was not water proof. When using such prior protector caps, care must be taken to keep the connector end of the cable away from damp places and they must not be allowed to lie in the water such as may be necessary under certain conditions on the floors of mines or other places which have similar conditions.

It is an object of the instant invention to provide a protector cap for the connector end of an electrical cable which will protect the exposed electrical fixtures of the cable end from water, dirt, and dust.

It is another object of the instant invention to provide protector means for the connector end of an electrical cable which will be easy to apply and easy to remove.

It is a further object of the instant invention to provide a readily removable water proof seal to the connector end of an electrical cable.

It is a still further object of the instant invention to provide a removable water proof seal for the connector end of an electrical conductor, the electrical characteristics of which may be electrically tested while the seal is in protecting relation to the cable end.

Other objects and the nature and advantages of the invention will be apparent from the following description taken in conjunction with the accompanying drawings, wherein.

Figure 1:
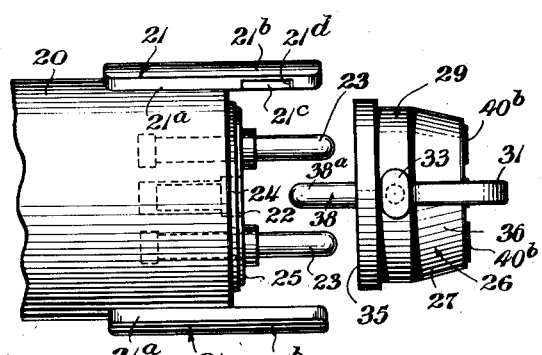
Figure 1 is a view in elevation of a portion of a multiple conductor cable end and one form of protecting seal adapted to be associated therewith.

Referring to the drawings, the four conductor cable end 20 is provided with a pair of rigid cable connector elements 21 having portions 21a secured to the cable end 20 and projecting portions 21b formed on their inner sides with hook-like depressions 21c. The open face 22 of the cable end 20 is provided with two projecting prongs 23 and two depressed sockets 24. The two prongs 23 and the two sockets 24 are electrically connected to the four conductors within the cable and are each insulated from each other by a relatively soft and resilient rubber-like material 24' such as rubber or synthetic rubber-like material having the characteristics of being relatively soft and resilient. Formed on the face of the rubber or rubber-like material 24' is a projecting bead 25 having generally a half round section and ring-like shape concentric to the face 22.

Figure 10:
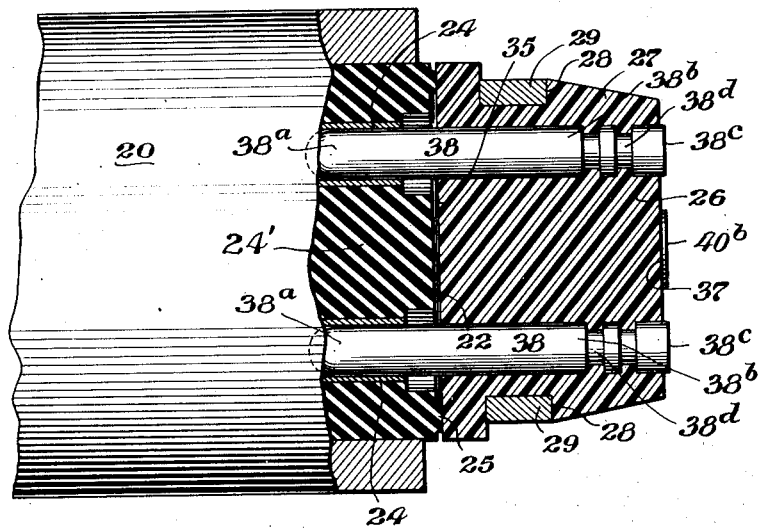
Fig. 10 is a view similar to Fig. 9 but taken at right angles thereto.

The protector cap 26 may comprise a body 27 formed of a relatively rigid water resistant insulating material which may be made of a plastic compound such as cellulose acetate butyrate. Around the waist of the body 27 and located within a circular groove or channel 28, see Figure 10, is a metal ring 29 which is of such dimension that it may be rotated about the waist of the body 27 but may not be moved axially of the generally cylindrical cap 26 as it is confined against axial movement by the side walls of the circular groove or channel 28. Pivotally connected to the ring 29 by the inwardly projecting pins 30 is the bail-like handle 31 in a manner such that the handle can be rotated about the pins 30 which cooperate with bearing sockets 32 in the ring 29 through an angle of somewhat more than 180°. Outwardly projecting from the ends of the bail-like handle 31 are the cams 33 which are adapted to cooperate with the hook-like depressions 21c formed in the rigid cable connector elements 21. The cam surfaces 34, which may be generally elliptical in section, are adapted to cooperate with the walls 21d of the hook-like depressions 21c.

Figure 2:
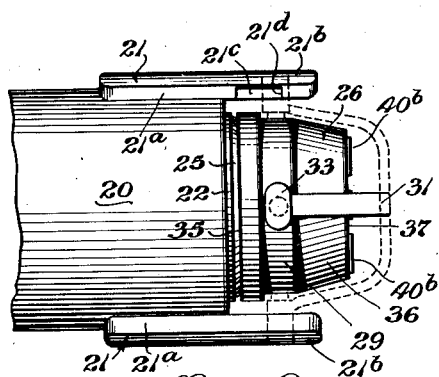
Fig. 2 is a view similar to Fig. 1 with the seal partially associated with the cable end.

In order to effect a water proof seal about the conductor cable end, the protector cap is associated with the face of the cable end in a manner such that the inner face 35 of the cap is in contact with the bead 25 on the face 22 of the cable end 20 and the bail-like handle 31 is in the position shown in full lines in Figure 2. Then with or without a slight inward pressure the bail-like handle 31 is rotated about the axis of the cable and the axis of the cap through an angle of approximately 90° to the position shown in dotted lines in Figure 2. In carrying out this operation the cap remains relatively stationary and the ring 29 is rotated within the circular groove or channel 28 until the cams 33 are within the depressions 21c within the connector elements 21. Then the bail-like handle 31 is rotated about the axis passing through the pins 30 through an angle of slightly more than 90° in a manner such that the cam surfaces 34 then push against the wall 21d of the depression 21c formed in the element 21 in a direction outwardly from the face of the cable end 20 and the reaction to this force causes the cap 26 to be pressed tightly against the face 22 of the cable end 20 and compress the bead 25 to form a water tight dust proof, dirt proof seal.

The outer portion 36 of the cap 26 is tapered generally in the form of a truncated cone so that the bail-like handle 31 may be made relatively small and still clear the cap 26 when it is rotated about the axis of the pins 30. The bail-like handle 31 is sufficiently large so as to clear the outer face 37 of the cap 26 and provide a convenient grip. When the bail-like handle 31 is rotated about the pins 30 with the cams 33 within the depressions 21c the rotation continues until the center of the bail-like handle 31 passes beyond the plane which is at a 90° angle to the axis of the cable and cap. A slight locking action takes place so that the cap will not be prematurely released. With the construction described and shown in the drawings the bail-like handle 31 may be rotated about the pins 30 through an angle of slightly more than 90° in either direction so that the operator may select the direction most convenient.

When it is desired to be able to test the conductors of the cable with the protector in place, that form of the invention which is shown in Figures 1, 2, 5, 6, 7, 9 and 10 may be utilized. The cap 26 is provided with two electrical conducting prongs 38 which cooperate with the sockets 24 in the cable end 20. These prongs 38 are provided with portions 38a which fit within the sockets 24, portions 38b which may be molded within the plastic substance of the body of the cap, and exposed contact portions 38c which may project slightly from the face 37 of the cap 26. The portions 38b may be formed with configurations such as shown at 38d to lock the prongs 38 within the plastic substance of the cap 26 against relative movement.

In order to provide electrical cooperating means with the prongs 23 projecting from the cable end 20, the cap 26 is provided with a pair of generally cylindrical holes 39 passing therethrough. At the outer ends of these holes electrical conducting cups 40 having portions 40a locked within the plastic substance of the cap 26, and portions 40b, which may project from the outer face 37 of the cap 26, are located. Arranged within the cups 40 are the electrical conducting springs 41 in order that good electrical current transmission may be effected to the projecting portions 40b from the prongs 23 through the conducting springs 41 which are prevented from having axial movement by their configuration which coacts with the inner side of the locking formations 40a.

In order to test the conductors within the cable with the cap 26 locked in place and the bail like handle 31 moved away from the outer face 37 of the cap 26, it is only necessary to apply the electrical testing apparatus to the exposed portions 38c of the prongs 38 and the exposed portions 40b which are electrically connected to the conductors within the cable associated with the prongs 23.

Figure 3:
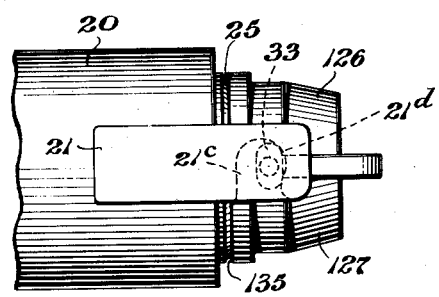
Fig. 3 is a view similar to Fig. 2 but showing a second form of protecting seal.
Figure 4:
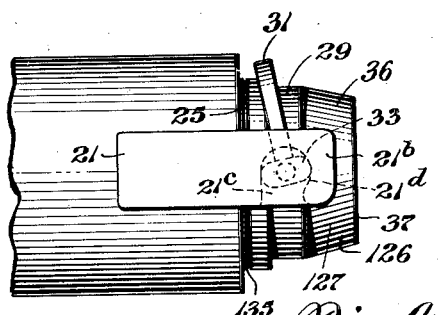
Fig. 4 is a view similar to Fig. 3 with the protecting seal locked in place.
Figure 5:
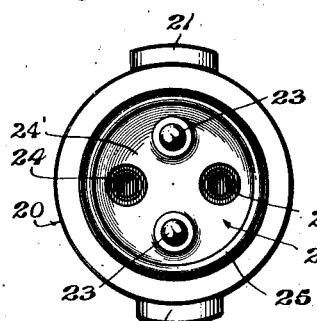
Fig. 5 is a plan view of the exposed face of the cable end.
Figure 7:
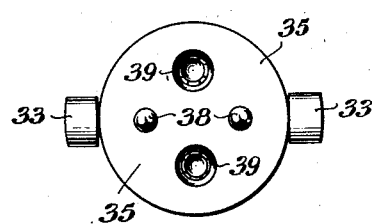
Fig. 7 is a plan view of the inner face of the seal shown in Figures 1 and 2.
Figure 6:
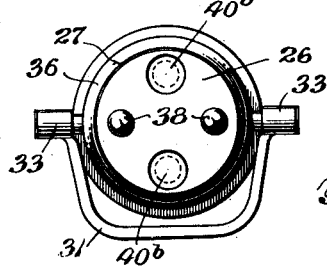
Fig. 6 is a plan view of the outer face of the seal shown in Figures 1 and 2.
Figure 8:
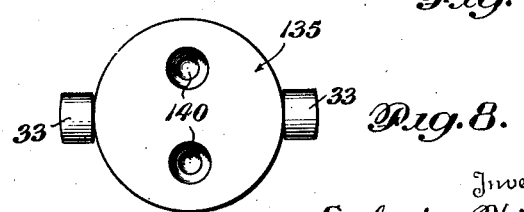
Fig. 8 is a plan view of the inner face of the seal shown in Figures 3 and 4.
Figure 9:
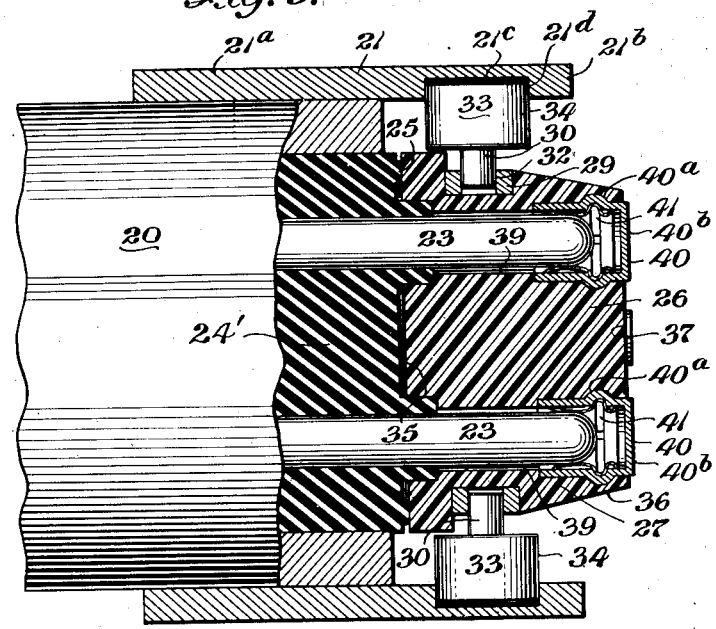
Fig. 9 is an enlarged view similar to Fig. 2 with the protector cap and a portion of the cable shown in section, the protector cap being locked in sealing position.

When it is merely necessary that a water proof seal be provided for the cable end and it is not necessary to test the conductors within the cable with the protecting seal in place, the protector cap 126 shown in Figs. 3, 4 and 8 may be utilized. Protector cap 126 is generally similar to the protector cap 26 but there are no electrical conducting portions exposed on the outer face 37, provision being made, however, to receive any projections of electrical conducting elements extending from the cable end within the body 127. As shown in the drawings, generally cylindrical holes 140 extending from the inner face 135 in a direction parallel to the axis of the protector cap, but not all the way through, are formed within the body 127. As shown in the drawings these holes are adapted to cooperate with the prongs 23. With the cap 126 locked in place and the bead 25 compressed as shown in Fig. 4, an efficient water proof, dirt proof, dust proof seal is effected for the electrical conducting portions which would normally be exposed at the face 22 of the conductor cable end 20.

While the invention has been described in connection with a four conductor cable, it is to be understood that it is within the scope of the invention to design the protecting seal so as to accommodate either single conductor cables or multi-conductor cables.

It will be obvious to those skilled in the art that various changes may be made without departing from the spirit of the invention and therefore the invention is not limited to what is shown in the drawings and described in the specification but only as indicated in the appended claims.

What is claimed is:

1. An electrical cable end protector cap adapted to provide a water proof seal for a cable end having a resilient exposed face and rigid portions, said cap having a relatively rigid sealing surface, and means for cooperating with said rigid portions on said cable for forcing the sealing surface of said cap against said resilient exposed face of said cable end, said cooperating means comprising a ring mounted for rotation about an axis coinciding with the axis of said cap and cable, a cam pivotally mounted on said ring for rotation about an axis perpendicular to the axis of said cap and cable, means for rotating said ring about its axis and said cam about its axis.

2. The structure recited in claim 1, said means for rotating said ring about its axis and said cam about its axis comprising a bail-like handle fixed to said cam.

3. An electrical cable end protector cap adapted to provide a water proof seal for a cable end having a resilient exposed face, rigid portions, an electrical conducting projecting prong, and an electrical conducting depressed socket; said cap having a relatively rigid sealing surface, an electrical conducting prong projecting from its inner face for cooperation with the socket in said cable, an electrical conducting socket for cooperation with the electrical conducting prong extending from said cable, and means for cooperating with said rigid portions on said cable for forcing the sealing surface of said cap against said resilient exposed face of said cable end, the prong on said cap extending from its inner face through said cap to its outer face and being locked in said cap, said socket in said cap extending through the cap to at least the outer face thereof and including a spring contact element therein, said socket being locked in said cap, said prong and socket in said cap being insulated from each other, whereby when said cap is in sealing relation to the cable end the conductors within said cable may be electrically tested by applying an electrical testing apparatus to the exposed socket and prong portions on the outer face of said cap.

4. An electrical cable end protector cap adapted to provide a waterproof seal for a cable end having a resilient exposed face, rigid portions, and a pair of electrical conducting elements projecting from within the periphery of said resilient exposed face, said cap having a relatively rigid sealing surface on its inner face, a pair of depressions on its inner face arranged to extend from within the periphery of said sealing surface and adapted to receive the pair of projecting elements on said cable, means on said cap for cooperating with said rigid portions on said cable for forcing the sealing surface of said cap against said resilient exposed face of said cable end, said means including a pair of cam elements mounted for rotation about the axis of said cap and also mounted for rotation about an axis perpendicular to the axis of said cap, whereby said cams may first be rotated about the axis of said cap into juxtaposition with the rigid portions on said cable end and then rotated about the axis perpendicular to the axis of said cap for engagement with said rigid portions in a manner to force the sealing surface of said cap against the resilient exposed face of said cable end in order to protect the projecting conducting element.

5. An electrical cable end protector cap adapted to provide a waterproof seal for a cable end having an exposed face, rigid portions, and an electrical conducting element associated with said face and within the periphery thereof, said cap having a sealing surface on its inner face, means on said cap for cooperating with said rigid portions on said cable for forcing the sealing surface of said cap against the exposed face of said cable end, one of said faces being of resilient material and the other of said faces being of rigid material, said means including a pair of cam elements mounted for rotation about the axis of said cap and also mounted for rotation about an axis perpendicular to the axis of said cap, whereby said cams may first be rotated about the axis of said cap into juxtaposition with the rigid portions on said cable end and then rotated about the axis perpendicular to the axis of said cap for engagement with said rigid portions in a manner to force the sealing surface of said cap against the exposed face of said cable end in order to seal the exposed face of said cable end.

6. An electrical cable end protector cap adapted to provide a waterproof seal for a cable end having a resilient exposed face and rigid portions, said cap having a relatively rigid sealing surface and means for cooperating with said rigid portions on said cable for forcing the sealing surface of said cap against said resilient exposed face of said cable end to provide a waterproof, dust proof, and dirt proof seal, said cooperating means comprising a cam element mounted for rotation about an axis substantially perpendicular to the axis of said cable end and cap, said cam being mounted for rotation about a pivot point located on a ring which is rotatable about an axis coinciding with the axis of said cable and cap.

7. An electrical cable end protector cap adapted to provide a waterproof seal having a cable end having an exposed surface, a rigid portion, and an electrical conducting element associated with said surface and within the periphery thereof, said cap having a sealing surface, means on said cap for cooperating with said rigid portion on said cable for forcing the sealing surface of said cap against the exposed surface of said cable end, said means including a cam means mounted for rotation about the axis of said cap and also mounted for rotation about an axis perpendicular to the axis of said cap, whereby said cam means may first be rotated about the axis of said cap into juxtaposition with the rigid portion of said cable end and then rotated about the axis perpendicular to the axis of said cap for engagement with said rigid portion in a manner to force the sealing surface of said cap against the exposed surface of said cable end in order to seal the exposed surface of said cable end.

EPHRAIM WINER.

REFERENCES CITED

The following references are of record in the file of this patent:

UNITED STATES PATENTS

| Number | Name | Date |
| --- | --- | --- |
| 2,035,657 | Kottemann | Mar. 31, 1936 |
| 1,158,708 | Mulligan | Nov. 2, 1915 |
| 1,978,510 | Spence, Jr. | Oct. 30, 1934 |
| 945,927 | Forster | Jan. 11, 1910 |
| 2,345,229 | Barmack | Mar. 28, 1944 |
| 1,293,892 | Olavessen | Feb. 11, 1919 |
| 243,803 | Scoville | July 5, 1881 |
| 1,588,183 | Goddard | June 8, 1926 |